United States Patent [19]

Scheer

[11] Patent Number: 5,257,881
[45] Date of Patent: Nov. 2, 1993

[54] INSERT FOR CHIP REMOVING TOOLS

[75] Inventor: Gerhard Scheer, Loechgau, Fed. Rep. of Germany

[73] Assignee: Komet Praezisionswerkzeuge Robert Breuning GmbH, Besigheim, Fed. Rep. of Germany

[21] Appl. No.: 835,940
[22] PCT Filed: Jul. 17, 1990
[86] PCT No.: PCT/EP90/01168
§ 371 Date: Feb. 14, 1992
§ 102(e) Date: Feb. 14, 1992
[87] PCT Pub. No.: WO91/02614
PCT Pub. Date: Mar. 7, 1991

[30] Foreign Application Priority Data

Aug. 18, 1989 [DE] Fed. Rep. of Germany ....... 3927328

[51] Int. Cl.5 .............................................. B23B 29/04
[52] U.S. Cl. ..................................... 408/153; 408/181
[58] Field of Search .............. 408/153, 181, 184, 238, 408/146

[56] References Cited

U.S. PATENT DOCUMENTS

| 3,220,288 | 11/1965 | Yogus ................... | 408/181 |
| 3,434,376 | 3/1969 | Benjamin et al. ..... | 408/153 |
| 3,697,187 | 10/1972 | Faber et al. ........... | 408/238 |
| 3,741,672 | 6/1973 | Hedberg ............... | 408/181 |

FOREIGN PATENT DOCUMENTS

| 609501 | 11/1960 | Canada .................... | 408/153 |
| 1270364 | 6/1968 | Fed. Rep. of Germany ...... | 408/153 |
| 1477836 | 5/1970 | Fed. Rep. of Germany . | |
| 1752012 | 8/1971 | Fed. Rep. of Germany . | |
| 2409143 | 5/1975 | Fed. Rep. of Germany ...... | 408/153 |
| 2535935 | 3/1976 | Fed. Rep. of Germany . | |
| 2931302 | 2/1981 | Fed. Rep. of Germany . | |
| 3234057 | 3/1984 | Fed. Rep. of Germany . | |
| 3418615 | 11/1984 | Fed. Rep. of Germany . | |
| 2100152 | 12/1982 | United Kingdom ................ | 408/153 |

OTHER PUBLICATIONS

Dubbel Taschenbuch fuer den Maschinenbau–13th Edition, Authors: Sass, Bouché and Leitner Springer-Verlag Berlin Heidelberg New York 1970–pp. 680–683.

Primary Examiner—Daniel W. Howell
Attorney, Agent, or Firm—Flynn, Thiel, Boutell & Tanis

[57] ABSTRACT

An insert for chip removing tools has a housing (10) that can be inserted in a recess in the base body of a tool. A threaded sleeve (16) is rotatably mounted in the housing (10) so as not to slide under the effect of an axial force. A machining blade insert holder (14) is non-rotatably guided in the housing (1) and is provided with an adjustment thread (21) that engages the threaded sleeve (16). The machining blade insert holder (14) is axially moved by rotating the threaded sleeve (16) and carries a reversible machining blade insert (12) on its head (18) that projects beyond the housing (10). In order to ensure a clearance free advance of the machining blade insert holder (14), an axial force exerted by a threaded clamping ring (78) on the threaded sleeve (16) is deviated by a clamping sleeve (60) with tapering front faces (62, 63) and two tapering bearing rings (66, 67) so that the threaded faces of the threaded sleeve (16) and of the machining blade insert holder (14) are pressed against each other by prestressing forces that act radially from the outside on the wall (50) of the threaded sleeve (16). In order to allow the threaded sleeve (16) to be elastically deformed, the threaded sleeve has in its threaded zone at least one radial through slot (46) which extends essentially in the axial direction.

17 Claims, 3 Drawing Sheets

INSERT FOR CHIP REMOVING TOOLS

FIELD OF THE INVENTION

The invention relates to an insert for chip removing tools comprising a housing insertable into a recess of a tool base body, which recess is preferably constructed as a blind hole, a rotatably supported adjusting spindle which becomes fixed against movement by the action of an axial force in the housing, and a machining blade insert holder axially movably guided and fixed against rotation in the housing, the holder engaging with an adjustment thread thereon a thread on the adjusting spindle to facilitate axial movement by rotating the adjusting spindle, the holder carrying a machining blade insert on its head projecting beyond the housing.

BACKGROUND OF THE INVENTION

Inserts of this type can be inserted into recesses of boring tools and stationary chip-removing tools and can, when necessary, be easily replaced with other inserts. Since the recesses in the tool base body are in most cases designed as a toleranced bore or as a broached square opening, the machining blade insert holder is advantageously adjusted from the front faces of the recess. An adjusting from the blade side is thereby to be preferred in particular for rotating tools having a large diameter and for axially elongate tools.

In the case of an insert of this type (DE-PS 29 31 302) inserted into a blind hole of a boring head, the adjustment of the machining blade insert holder is done by rotating an adjusting element engaging with a threaded pin in a tapped hole of the machining blade insert holder to become axially lockable within the housing. However, a clearance free advancing of the machining blade insert holder is not possible with the known insert, since the clearance between threaded pin and adjustment thread cannot be eliminated. In order to eliminate the thread clearance, the machining blade insert holder must always be advanced in the same direction.

SUMMARY OF THE INVENTION

Starting out from this, the basic purpose of the invention is to provide an insert for chip removing tools, the machining blade insert holder of which can be fed clearance free.

The invention is based on the thought of pressing the adjusting spindle designed as a threaded sleeve in radial direction against the adjustment thread of the machining blade insert holder in order to eliminate in this manner both the radial clearance of the machining blade insert holder and also the axial thread clearance. The threaded sleeve is pressed against the adjustment thread according to the invention by varying the axial force with which the threaded sleeve is clearance free clamped in the housing. A radial through, essentially axially extending, slot in the thread area guarantees that the threaded sleeve rests with an initial force and clearance free against the adjustment thread. A clamping sleeve gripping around the threaded sleeve in the thread area and axially clamped between shoulders on the threaded sleeve and on the housing, which shoulders face one another, is elastically deformable by the action of the axial force and can thereby be radially pressed against the threaded sleeve.

Also the clamping sleeve can have several axial slots distributed over its periphery and which extend alternately in opposite directions.

The clamping sleeve rests according to a further preferred embodiment of the invention with tapered axially facing faces against an inside tapered surface arranged on the shoulder on the side of the housing and on the shoulder on the side of the threaded sleeve. The inside tapered surfaces can thereby each be formed by a bearing ring axially supported against the shoulders on the threaded sleeve and on the housing and radially against a bore surface in the housing.

A further preferred embodiment of the invention provides a threaded clamping ring threadedly received into an internal thread of the housing, which threaded clamping ring can apply through a ball ring an axial force axially against the threaded sleeve arranged in the housing. The threaded sleeve has thereby advantageously an annular flange, the front face of which, which face is on the side of the machining blade insert, serves as a rolling surface for the balls of the ball ring.

According to a preferred embodiment of the invention, the threaded sleeve has at its end, which end is on the side of the machining blade insert, a guide bore preferably enlarged compared with the internal thread for a cylindrical shaft part of the machining blade insert holder.

In order to prevent the machining blade insert holder from rotating, same has according to a further preferred embodiment of the invention at its end remote from the machining blade insert a coupling adapter guided fixed against rotation in an axial guideway in the housing. The axial guideway is advantageously constructed as a recess having many corners, preferably is square in cross section, in which recess the coupling adapter is guided slidingly, accurately fittingly therewithin. In order to make the assembly of the tool easier, the coupling adapter can be placed with a keyway onto an axially projecting key pin of the machining blade insert holder and can be connected clearance free to same by an axial screw connection.

A further advantageous development of the invention provides that the threaded sleeve has at its end projecting beyond the housing, which end is on the side of the machining blade insert, a multi-cornered profile to receive an adjusting wrench.

A scale ring is advantageously forced fit onto the end of the threaded sleeve, which end projects beyond the housing on the side of the machining blade insert, to indicate the adjusted position of the machining blade insert holder. The scale ring covers, preferably axially, the threaded clamping ring and rests with an annular shoulder against a seal ring arranged in an axially, facing recess on the housing.

BRIEF DESCRIPTION OF THE DRAWINGS

The invention will be discussed hereinafter in greater detail in connection with one exemplary embodiment illustrated in the drawings, in which.

DETAILED DESCRIPTION

Figure 1:
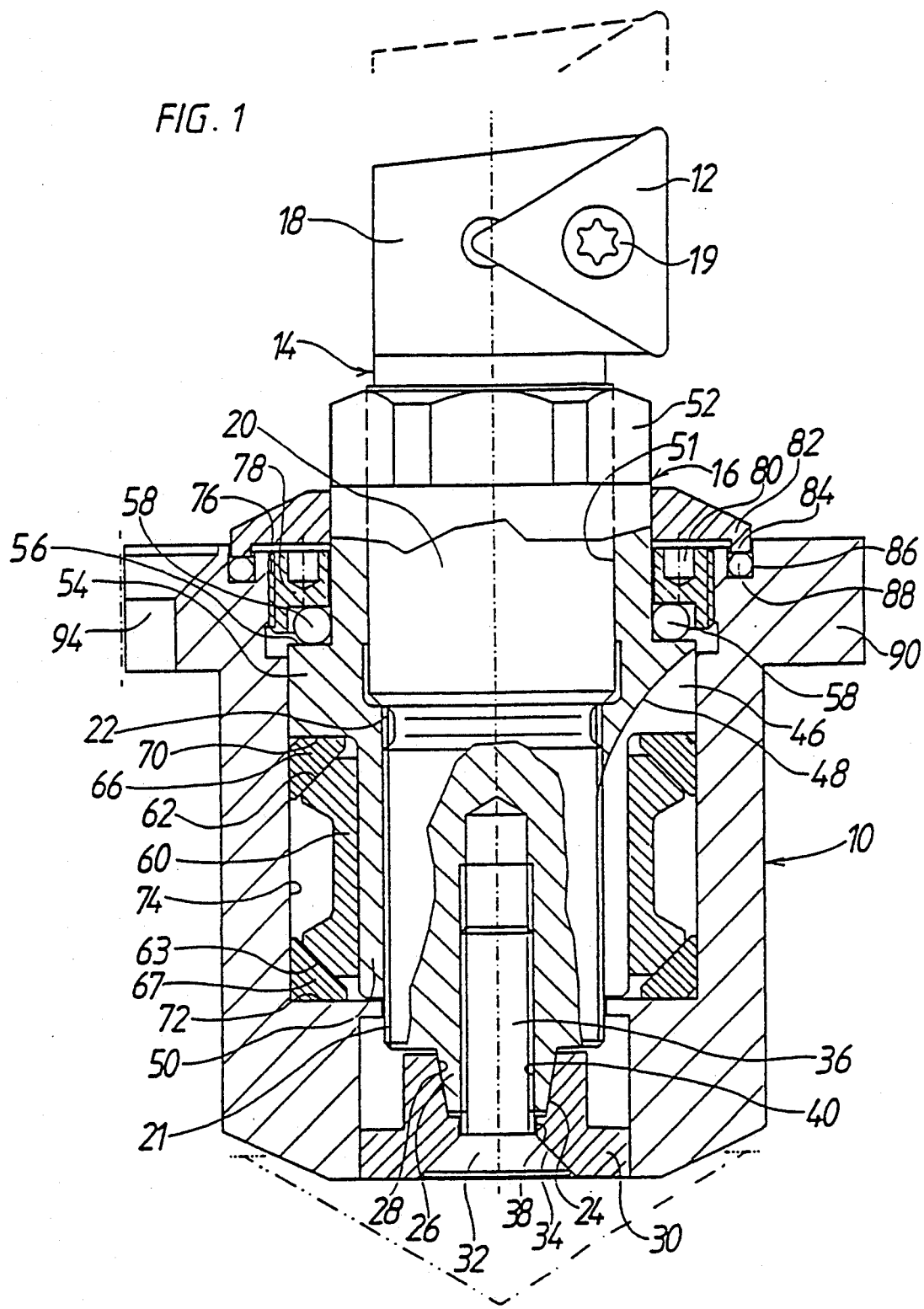
FIG. 1 is a partially cross-sectioned side view illustration of an insert insertable into a radial recess of a tool base body, which insert has an axially adjustable machining blade insert holder.
Figure 2:
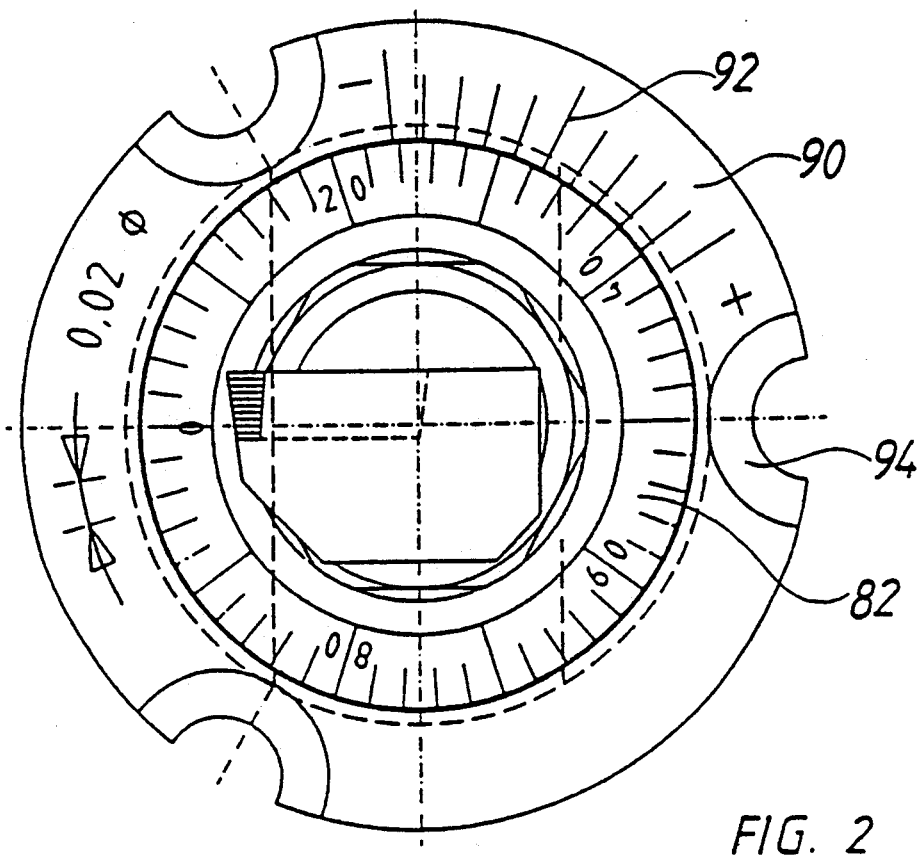
FIG. 2 is a front end view of the insert according to FIG. 1.
Figure 3:
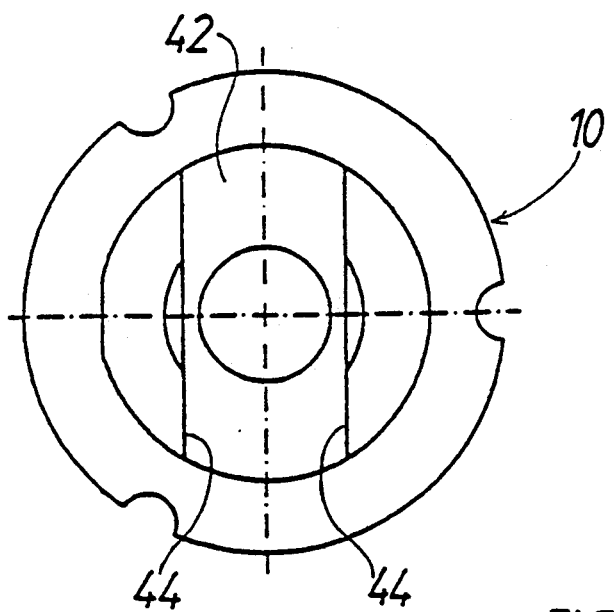
FIG. 3 is a rear end view of the insert housing.
Figure 4:
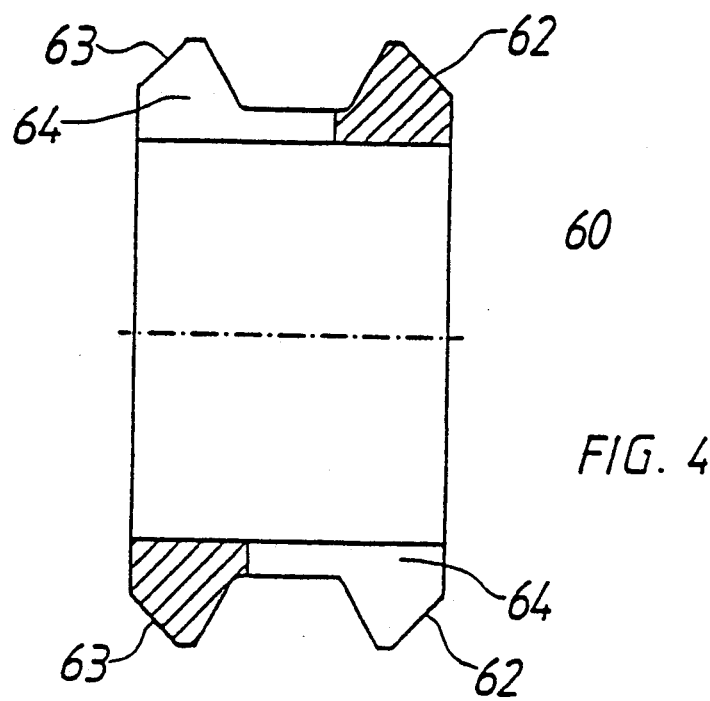
FIG. 4 is a longitudinal cross-sectional view of the clamping sleeve of the insert.
Figure 5:
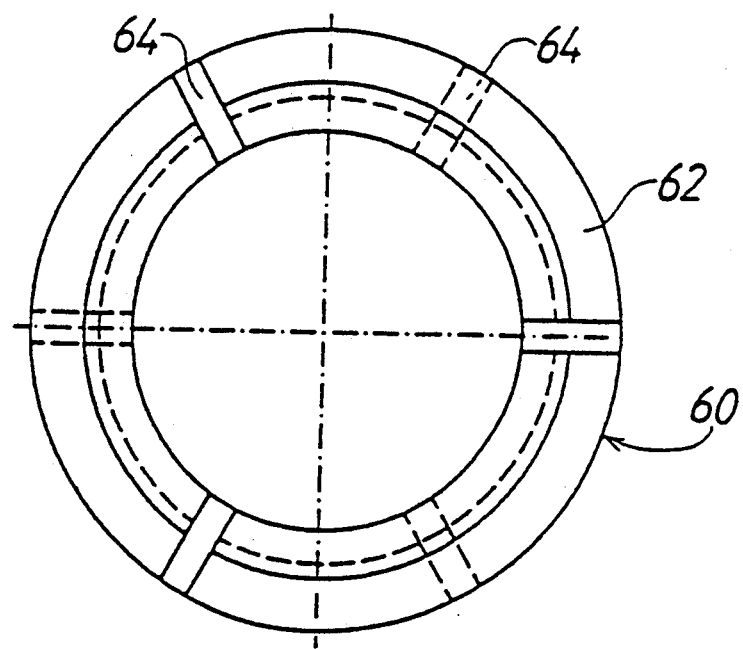
FIG. 5 is a front side view of the clamping sleeve according to FIG. 4.

The insert illustrated in the drawings is intended for insertion into a cylindrical blind hole in the base body of a precision turning tool.

The insert consists substantially of a cylindrical housing 10, a machining blade insert holder 14 axially adjustable within the housing 10 and carrying a reversible machining blade insert 12, and an axially fixed and rotatable adjusting spindle supported in the housing 10 and constructed as a threaded sleeve 16.

The machining blade insert holder 14 includes a cutting head 18 with a mounting 19 thereon for the reversible machining blade insert 12, and a guide shaft 20 contiguous with the cutting head 18 The machining blade insert holder 14 has an adjustment thread 21 on an end of the guide shaft 20 which is remote from the cutting head 18. The adjustment thread 21 engages an internal thread 22 of the threaded sleeve 16. A key pin 26 having inclined planes 24 is formed on an end face of the machining blade insert holder 14, which key pin 26 extends into a keyway 28 in a coupling adapter 30. The holder 14 and the coupling adapter 30 are fastened nonrotatably relative to one another by a clamping screw 36 countersunk with its head 32 in a conical opening 34 of the coupling adapter. The screw 36 extends through a bore 38 of the coupling adapter 30 and is received in a rearwardly opening tapped hole 40 in the machining blade insert holder 14.

The coupling adapter 30, connected to the machining blade insert holder 14, has two outer surfaces which are parallel to one another and which slide clearance free between two oppositely lying parallel inner surfaces 44 in a cross recess 42 arranged in the housing 10.

The threaded sleeve 16 has in the thread area an axially extending slot 46 open at one end in a circular-segment like cross-sectional contour 48, which slot completely penetrates through the cylindrical wall 50 of the threaded sleeve 16, which wall is designed relatively thin in the thread area. The slot 46 assures that the threaded sleeve 16 can be elastically deformed in the thread area by reducing its inside diameter and can thus be pressed against the adjustment thread 21 of the machining blade insert holder 14 by a radially acting prestressing force.

The threaded sleeve 16 has at its end adjacent the machining blade insert a guide bore 51 for receiving therein the guide shaft 20 of the machining blade insert holder 14, which guide bore is enlarged compared with the internal thread 22. A hexagonal profile 52 on the threaded sleeve projects beyond the front end face of the housing 10 to receive an adjusting wrench. The threaded sleeve 16 has a circular flange 54 on its outer surface, a front face 56 thereof facing the machining blade insert serves as a rolling surface for the balls 58 of a ball ring.

A clamping sleeve 60 grips around the threaded sleeve 16 in its thread area and has tapered axially facing faces 62, 63 and several axially extending slots 64 distributed over the periphery thereof which extend alternately in opposite directions. The tapered faces 62, 63 of the clamping sleeve 60 rest against an inside taper on two bearing rings 66, 67 which are supported in axial direction against an annular shoulder 70 on the threaded sleeve 16 and also a shoulder 72 on the housing 10 and in radial direction against the cylindrical inside surface in a housing bore 74.

The threaded sleeve 16 is axially fixed in the housing 10 with the in between clamping of the clamping sleeve 60 supported between the bearing rings 66, 67 and by a threaded clamping ring 78 threadedly received in an internal thread 76 of the housing 10 and the ball ring. The axial pressure applied by the threaded clamping ring 78 is divided into an axial and a radial force component in the area of the conical bearing surfaces between the bearing rings 66, 67 and the clamping sleeve 60. While the threaded sleeve 16 is placed in a clearance free relation in axial direction by the axial component provided by the clamping sleeve 60, the radial component results from an elastic deformation of the clamping sleeve 60 in direction of the threaded sleeve 16, which itself is elastically deformed in the area of its slot 46 radially against the adjustment thread 21 of the machining blade insert holder 14 and places same into the clearance free relation.

The threaded clamping ring 78 has recesses 80 therein for engagement by an adjusting wrench. In the mounted state, the ring 78 is covered by a scale ring 82 forced fit onto an end of the threaded sleeve 16, which end is on the side of the machining blade insert, and carrying thereon a scale for indicating the degree of adjustment. The scale ring 82 has an annular shoulder 84 resting against a seal ring 88 arranged in an axially opening recess 86 on the housing 10.

The housing 10 has on a side facing the machining blade insert a circular flange 90 having a vernier scale 92, which flange has several edge-opening countersunk bores 94 to receive fastening screws received in the tool base body.

The embodiments of the invention in which an exclusive property or privilege is claimed are defined as follows.

1. An insert for chip removing tools comprising a housing insertable into a recess of a tool base body, a rotatably supported adjusting spindle having an internal thread thereon, means of providing an axial force for fixing the adjusting spindle against movement in the housing, and a machining blade insert holder and means for axially movably guiding and fixing the machining blade insert holder against rotation in the housing, said holder having an adjustment thread thereon engaging the internal thread on the adjusting spindle to facilitate axial movement thereof by rotating the adjusting spindle, said holder carrying a machining blade insert having a head part projecting axially beyond said housing, the adjusting spindle being designed as a threaded sleeve including means for facilitating an elastic deformation of its internal thread radially against the adjustment thread on said machining blade insert holder by a portion of the axial force applied thereto, the threaded sleeve having in a thread area thereon at least one radial through slot extending substantially axially, and wherein a clamping sleeve is provided which grips around the threaded sleeve in the thread area and is clamped axially between opposing shoulders on the threaded sleeve and on the housing, said clamping sleeve including means for facilitating a radially elastic deformation thereof radially against said threaded sleeve in response to the axially applied force thereto.

2. The insert according to claim 1, wherein the slot is open at the end of the threaded sleeve remote from the machining blade insert.

3. The insert according to claim 1, wherein the slot is closed at both ends.

4. The insert according to claim 1, wherein the clamping sleeve has several axially extending recesses distributed over its circumference.

5. The insert according to claim 4, wherein the axially extending recesses extend alternately in opposite directions.

6. The insert according to claim 1, wherein the clamping sleeve has tapered axially facing faces each resting against an inside tapered surface arranged on said shoulders on a side of said housing and on a side of said threaded sleeve.

7. The insert according to claim 6, wherein the inside tapered surface is defined by bearing rings resting axially against the shoulders on the threaded sleeve and on the housing and radially against a bore surface in the housing.

8. The insert according to claim 1, including a threaded clamping ring threadedly rotated into an internal thread in the housing on a side of the housing adjacent the blade insert, the threaded clamping ring applying through a ball ring an axial force axially against the threaded sleeve arranged in the housing.

9. The insert according to claim 8, wherein the threaded sleeve has an annular flange, a face of which is on the side of the machining blade insert serves as a rolling surface for the balls of the ball ring.

10. The insert according to claim 1, wherein the threaded sleeve has at its end on the side of the machining blade insert a guide bore for a cylindrical shaft part of the machining blade insert holder, which guide bore is larger in diameter as compared with a diameter of said internal thread.

11. The insert according to claim 1, wherein the machining blade insert holder has at its end remote from the machining blade insert a coupling adapter guided fixed against rotation in an axial guideway of the housing.

12. The insert according to claim 11, wherein the axial guideway is designed as a recess, which is multi-edged, preferably square in cross section, in which recess the coupling adapter is guided slidingly, accurately fittingly, therewithin.

13. The insert according to claim 11, wherein the coupling adapter has a keyway receiving therein an axially projecting key pin on the machining blade insert holder and is connected clearance free to same by an axially extending screw connection.

14. The insert according to claim 1, wherein the threaded sleeve has a multi-cornered profile at an end thereof adjacent the machining blade insert and projecting beyond the housing to facilitate receiving thereon an adjusting wrench.

15. The insert according to claim 1, wherein a scale ring axially covering the thread clamping ring is forced fit onto the end of the threaded sleeve adjacent the machining blade insert.

16. The insert according to claim 15, wherein the scale ring rests with an annular shoulder thereof against a seal ring arranged in an axial recess in the housing.

17. The insert according to claim 1, wherein the housing on the side adjacent the machining blade insert has a circular flange with blind holes open at an edge to receive therein fastening screws provided on the tool base body.

* * * * *